E. Holmes,
Dressing Staves.

N° 37,720.   Patented Feb. 17, 1863.

Witnesses:
E. B. Forbush
E. Osborne

Inventor:
Edward Holmes

UNITED STATES PATENT OFFICE.

EDWARD HOLMES, OF BUFFALO, NEW YORK, ASSIGNOR TO E. AND B. HOLMES, OF SAME PLACE.

IMPROVEMENT IN STAVE-DRESSING MACHINES.

Specification forming part of Letters Patent No. 37,720, dated February 17, 1863.

*To all whom it may concern:*

Be it known that I, EDWARD HOLMES, of the city of Buffalo and State of New York, assignor to EDWARD HOLMES and BRITAIN HOLMES, of the same place, have invented certain new and useful Improvements in Stave-Dressing Machines, (as an improvement upon a stave-dressing machine patented to Edward Holmes and Britain Holmes on the 19th day of February 1861;) and I do hereby declare that the following is a full, clear, and exact description thereof, reference being had to the accompanying drawings, making a part of this specification, in which—

Figure 1:
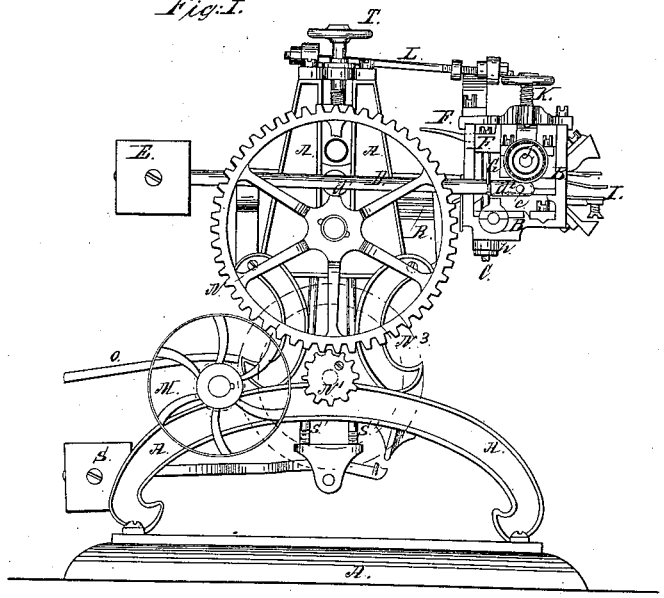
Figure 2:
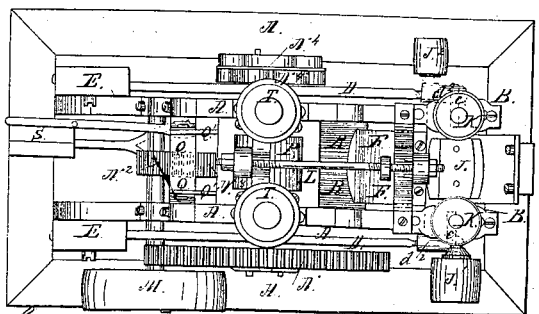

Figure 1 is a side elevation, and Fig. 2 is a top plan view.

The nature of my improvements relates, first, to providing a journal or journals for the support of the cutter-frame, which journal or journals are so connected to the cutter-frame as to support the cutter-frame and allow it to oscillate thereon; second, in so connecting the cutter-frame to the stationary or gear frame of the machine as to admit of a weight or equivalent to counterbalance the cutter-frame; third, in projecting bars or rods from the stationary frame as a means of support and as a connection of the cutter-frame to the stationary frame, which bars are so constructed and connected to both frames as to admit of a compound joint-like movement.

Letters of like name and kind refer to like parts in each of the figures.

The main and stationary frame of the machine which supports the feeding mechinism is represented at A. The cutter-frame, which is distinct from the main frame is represented at B. There is a shaft or journal, having a central connection to the cutter-frame and projecting from both sides of the frame, as shown at $c$, upon which journal or journals the frame hangs, and balances thereon, or nearly so, so that it may oscillate or swing thereon.

D represents a rod or supporting and balancing bar—one upon each side of the machine—which bars are for the purpose of supporting and balancing the cutter-frame. These bars have a connection to the main frame by means of a wrist or joint, as shown at $d'$. Upon the end of this bar, which connects with the cutter-frame is a thimble or cap, as shown at $d^2$, which thimble forms a bearing for the journal $c$. The connection of this thimble to the end of the bar is such as to allow it to turn on the bar slightly in an opposite direction to the joint $d'$, so that the two form a compound or universal joint which will allow the frame to rise and fall in either direction. The frame being supported upon the journals $c$, as aforesaid, which are free to move in their bearings in the thimble, will facilitate and make easy the rise and fall and oscillations of the frame in any direction, according to the particular condition of each stave to be dressed. Upon the opposite end or the bar is a counterbalancing-weight, E. This weight may be of sufficient gravity or have such advantage on the bar as to balance or poise the cutter-frame upon the wrist $d'$, so that the cutter-frame will rise and fall and oscillate easily as the stave is being dressed. A yielding pressure-plate is connected with the cutter-frame, so that the plate will slide up and down therein, as shown at F. Two rods pass down through this plate and through the bottom of the frame, one of which is shown at G. These rods have rubber-springs (or other springs may be used) on the lower end, as shown at $h$, which springs will render the plate sufficiently elastic and yielding to answer all the conditions required to accommodate itself to the condition of the stave to be dressed.

This machine is particularly designed for dressing split or rived staves, which generally have crooked and winding surfaces and vary much in thickness before there are dressed.

The improvements which I have introduced and herein described appear to meet and answer all the conditions for a complete and successful dressing of every quality of split or rived staves.

The other parts of the machine are substantially like the aforesaid machine patented to Edward and Britain Holmes on the 19th of February, 1861, and do not therefore require a particular description. I will only refer to some of the more principal parts by letter: I, yielding mouth-piece; J, upper cutter-head; J', driving-pulleys for upper cutter; J², driving-pulley for lower cutter; K, adjusting-screws; L, rod, (having rubber-springs,) which connects the upper part of the cutter-frame to the stationary frame; M, main driving-pulley; N, spur-wheel on shaft of lower feed-roller; N', pinion; N², pinion on driving-shaft; N³, spur-wheel; N⁴, double-star gearing on shafts of upper and lower feed-rollers, which mesh together; O, lever, which works the gear and ungear clutch; P, upper feed-roller, which is straight on its face. The lower feed-roller is convex. Q is the feed-table; Q', guides; R, convex bed-plate; S, weighted lever, which (through the rods S') is connected to the upper feed-roller in a manner to make the roller a yielding pressure-roller; T, adjusting-screws.

What I claim as my invention, and desire to secure by Letters Patent, is—

1. Supporting the cutter-frame upon a journal or journals, $c$, in such a manner that the frame may oscillate in any direction, according as the varying conditions of the stave to be dressed may require.

2. In a machine for dressing staves which has an oscillating or movable cutter-frame in connection with the stationary or gear frame, so supporting the cutter-frame as to admit of the use of a weight, or equivalent, as a counter-balance to the cutter-frame, substantially as set forth.

3. The projecting bars D, or equivalent, for the purpose of supporting and connecting the cutter-frame to the gear-frame, and to allow the cutter-frame to oscillate, as set forth.

EDWARD HOLMES.

Witnesses:
  E. B. FORBUSH,
  E. OSBORNE.